(12) United States Patent
Ramamurthi et al.

(10) Patent No.: US 10,334,611 B2
(45) Date of Patent: Jun. 25, 2019

(54) DEVICE, SYSTEM, AND METHOD FOR CARRIER AWARE SCHEDULING

(71) Applicant: APPLE INC., Cupertino, CA (US)

(72) Inventors: Vijay Kumar Ramamurthi, Milpitas, CA (US); Vijay Venkataraman, San Jose, CA (US); Swaminathan Balakrishnan, San Jose, CA (US); Tarik Tabet, San Jose, CA (US); Sarma Vangala, Campbell, CA (US); Sree Ram Kodali, San Jose, CA (US); Rafael Rivera-Barreto, Santa Clara, CA (US); Samy Khay-Ibbat, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 36 days.

(21) Appl. No.: 15/612,726

(22) Filed: Jun. 2, 2017

(65) Prior Publication Data

US 2018/0084562 A1 Mar. 22, 2018

Related U.S. Application Data

(60) Provisional application No. 62/398,070, filed on Sep. 22, 2016.

(51) Int. Cl.
*H04B 17/309* (2015.01)
*H04W 52/36* (2009.01)
*H04W 52/24* (2009.01)
*H04W 72/08* (2009.01)
*H04L 5/00* (2006.01)

(52) U.S. Cl.
CPC ........ *H04W 72/085* (2013.01); *H04B 17/309* (2015.01); *H04L 5/001* (2013.01); *H04W 52/242* (2013.01); *H04W 52/365* (2013.01)

(58) Field of Classification Search
None
See application file for complete search history.

(56) References Cited

U.S. PATENT DOCUMENTS

2012/0077445 A1\* 3/2012 Konno .................... H04L 5/001 455/67.11
2012/0099466 A1\* 4/2012 Aoyama ................ H04L 5/001 370/252

(Continued)

*Primary Examiner* — Ajit Patel
(74) *Attorney, Agent, or Firm* — Fay Kaplun & Marcin, LLP

(57) ABSTRACT

Described is a user equipment (UE) that is connected to a network component, the user equipment and the network component configured with a carrier aggregation functionality. The UE performs a method that includes determining a primary component carrier and at least one secondary component carrier associated with the carrier aggregation functionality of the user equipment, determining a component carrier quality measurement (CQM) metric for each of the component carriers, when an uplink data packet is capable of being transmitted over the secondary component carrier, selecting one of the primary component carrier and the at least one secondary component carrier based on the CQM metrics, generating measurement data indicative of the selected component carrier to increase a probability to transmit the uplink data packet over the selected component carrier and transmitting the measurement data to the network component.

20 Claims, 3 Drawing Sheets

(56) References Cited

U.S. PATENT DOCUMENTS

| | | | |
|---|---|---|---|
| 2012/0140708 A1* | 6/2012 | Choudhury | H04W 2/082 370/328 |
| 2013/0051337 A1* | 2/2013 | Kiyoshima | H04W 72/12 370/329 |
| 2013/0136015 A1* | 5/2013 | Ojala | H04L 5/001 370/252 |
| 2015/0382347 A1* | 12/2015 | Cheng | H04W 24/08 370/329 |
| 2017/0215191 A1* | 7/2017 | Martin | H04W 72/0453 |
| 2017/0238330 A1* | 8/2017 | Jiang | H04W 24/10 370/329 |

* cited by examiner

DEVICE, SYSTEM, AND METHOD FOR CARRIER AWARE SCHEDULING

PRIORITY CLAIM/INCORPORATION BY REFERENCE

This application claims priority to U.S. Provisional Application 62/398,070 entitled "Device, System, and Method for Carrier Aware Scheduling," filed on Sep. 22, 2016, the entirety of which is incorporated herein by reference.

BACKGROUND INFORMATION

A user equipment (UE) may be configured with a variety of different capabilities. For example, the UE may be capable of establishing a connection with a network. Specifically, the UE may connect to a Long Term Evolution (LTE) network. While connected to the LTE network, the UE may utilize further network capabilities. For example, the UE may utilize a carrier aggregation (CA) functionality in which a primary component carrier (PCC) and at least one secondary component carrier (SCC) are used to communicate data over the various LTE bands. The network component to which the UE has connected may be an evolved Node B (eNB) that provides the PCC. The connected eNB may also control how the carrier aggregation is to be utilized with the SCCs. For example, the eNB may request measurements for LTE bands which are associated with the SCCs and receive the measurements to determine how the available bands are to be used in the carrier aggregation functionality. Thus, the UE may have a plurality of LTE bands or component carriers that are available to communicate data.

The UE may utilize a media access control (MAC) layer that schedules transmissions of uplink data packets through component carriers on a first come first serve basis. Accordingly, the MAC layer is not concerned with whether the UE has the capability or is configured with the carrier aggregation functionality. That is, the MAC layer is not aware of a carrier aggregation delineation that exists in the physical (PHY) layer. With no discernment in scheduling uplink data packet transmissions, the MAC layer may potentially transmit high priority data packets with a poorly performing component carrier which leads to an overall poor user experience.

Furthermore, the UE is limited to a maximum uplink transmit power that is available over all component carriers that are being used. Thus, when carrier aggregation is configured with a plurality of component carriers being used, the maximum uplink transmit power is split among these component carriers. With this configuration, the UE may be transmitting on multiple uplink component carriers with a reduced efficiency as more power is required to activate all the component carriers and each component carrier is provided with decreasing transmit power.

SUMMARY

The exemplary embodiments describe a method performed by a user equipment connected to a network component, the user equipment and the network component configured with a carrier aggregation functionality. The method includes determining a primary component carrier and at least one secondary component carrier associated with the carrier aggregation functionality of the user equipment, determining a component carrier quality measurement (CQM) metric for each of the component carriers, when an uplink data packet is capable of being transmitted over the secondary component carrier, selecting one of the primary component carrier and the at least one secondary component carrier based on the CQM metrics, generating measurement data indicative of the selected component carrier to increase a probability to transmit the uplink data packet over the selected component carrier and transmitting the measurement data to the network component.

According to another exemplary embodiment, a user equipment has a transceiver configured to connect the user equipment to a network component, the user equipment and the network component configured for a carrier aggregation functionality and a processor configured to determine a primary component carrier and at least one secondary component carrier associated with the carrier aggregation functionality of the user equipment, determine a component carrier quality measurement (CQM) metric for each of the component carriers and, when an uplink data packet is capable of being transmitted over the secondary component carrier, the processor selects one of the primary component carrier and the at least one secondary component carrier based on the CQM metrics, generates measurement data indicative of the selected component carrier to increase a probability to transmit the uplink data packet over the selected component carrier, and wherein the transceiver transmits the measurement data to the network component.

The exemplary embodiments further describe a method performed by a user equipment connected to a network component, the user equipment and the network component configured with a carrier aggregation functionality. The method includes determining a primary component carrier and at least one secondary component carrier associated with the carrier aggregation functionality of the user equipment, measuring a component carrier quality measurement (CQM) metric for each of the component carriers, when an uplink data packet is capable of being transmitted over only the primary component carrier, determining whether the CQM metric of the primary component carrier is above a predetermined threshold, when the CQM metric of the primary component carrier is above the predetermined threshold, generating measurement data indicating the uplink data packet is to be transmitted over the primary component carrier and transmitting the measurement data to the network component.

According to a further exemplary embodiment, a user equipment has a transceiver configured to connect the user equipment to a network component, the user equipment and the network component configured for a carrier aggregation functionality and a processor configured to determine a primary component carrier and at least one secondary component carrier associated with the carrier aggregation functionality of the user equipment, measure a component carrier quality measurement (CQM) metric for each of the component carriers, when an uplink data packet is capable of being transmitted over only the primary component carrier, the processor determines whether the CQM metric of the primary component carrier is above a predetermined threshold and when the CQM metric of the primary component carrier is above the predetermined threshold, the processor generates measurement data indicating the uplink data packet is to be transmitted over the primary component carrier, and wherein the transceiver transmits the measurement data to the network component.

DETAILED DESCRIPTION

Figure 1:
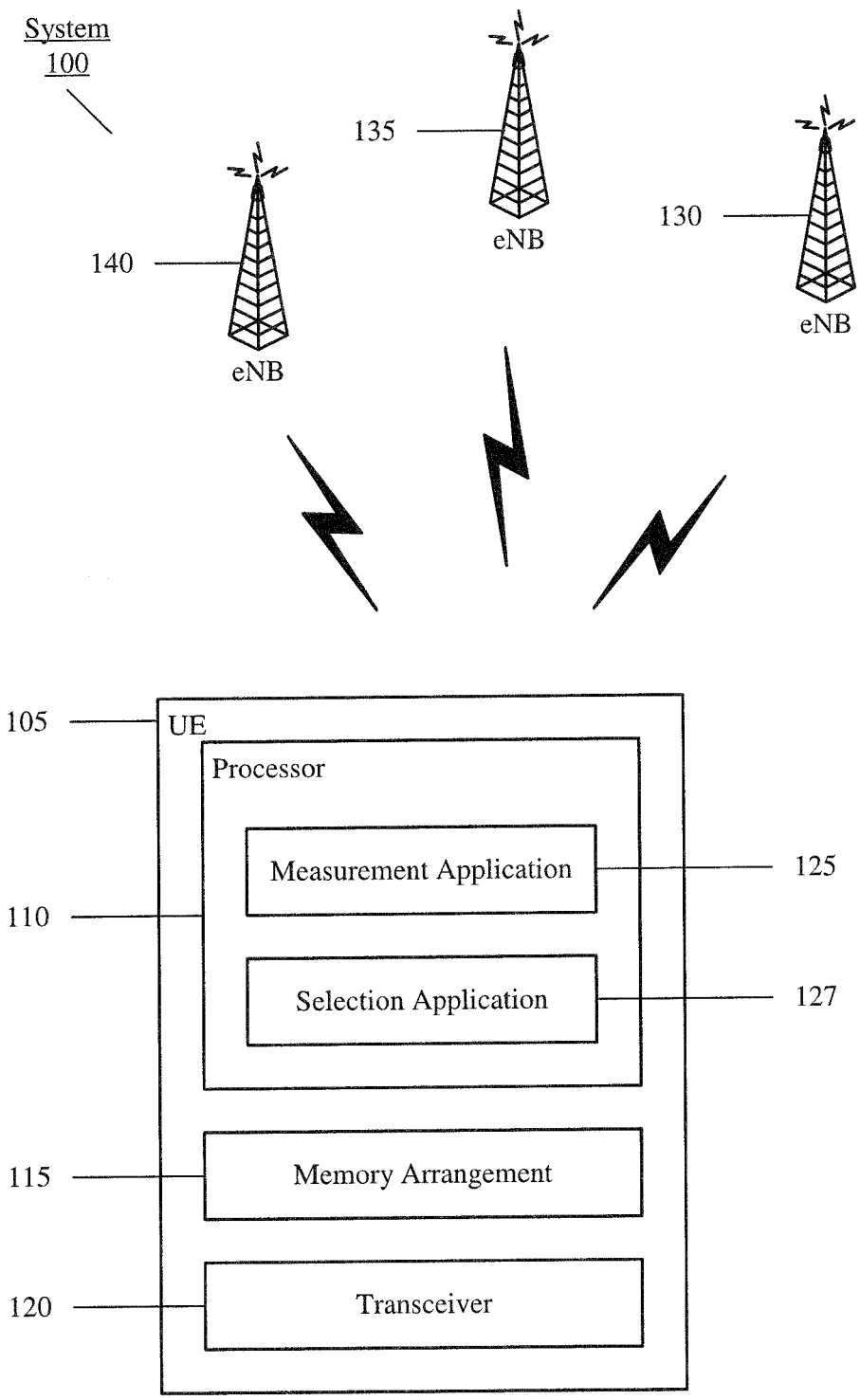
FIG. 1 shows a system where a user equipment utilizes a carrier quality metric to select a manner of transmitting uplink data according to various exemplary embodiments described herein.

The exemplary embodiments may be further understood with reference to the following description and the related appended drawings, wherein like elements are provided with the same reference numerals. The exemplary embodiments are related to a device, system, and method for utilizing a qualitative measurement of available component carriers to determine the manner that data is to be transmitted. Specifically, a user equipment (UE) may be connected to a Long Term Evolution (LTE) network in which the UE and the LTE network are configured with a carrier aggregation (CA) functionality where the CA functionality may include a primary serving cell (PCell) and at least one secondary serving cell (SCell). The exemplary embodiments provide a first mechanism for the UE that utilizes the qualitative measurement to modify a manner in which a media access control (MAC) layer schedules uplink transmissions on the component carriers. The exemplary embodiments provide a second mechanism for the UE that utilizes the qualitative measurement to perform a forceful component carrier switch operation such that the PCell has the best available component carrier. The exemplary embodiments provide a third mechanism for the UE that utilizes the qualitative measurement to perform a forceful release operation such that at least one remaining component carrier is provided further transmit power.

Initially, it is noted that the exemplary embodiments are described herein with regard to uplink transmissions from the UE to the network. However, those skilled in the art will understand that the mechanisms according to the exemplary embodiments may be modified and utilized with downlink transmissions from the network to the UE as well. For example, the exemplary embodiments are described herein with the UE performing operations to schedule uplink transmissions. However, as will become evident below, substantially similar operations may be performed to receive downlink transmissions. In addition, the exemplary embodiments are described with reference to an LTE network, but it will be understood to those skilled in the art that the functionalities described herein may be applied to devices that connect to any network that supports carrier aggregation.

The UE may associate with a network component which serves as the PCell. With a LTE network, the network component may be an evolved Node B (eNB). The PCell may control the manner in which the data is exchanged with the UE such as determining when uplink and downlink grants are given for the UE. The PCell may also control the mechanism used in exchanging data, particularly how data is transmitted to and received by the UE. When the UE is CA capable, CA functionality enables the PCell and one or more further SCell(s) to combine bandwidths to exchange data with the UE. The SCell may also be configured and activated by the eNB based on throughput requirements. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwith, a second Scell may provide a third portion of the total bandwidth, and so on. Although the CA functionality may provide an increased bandwidth available to transmit data, the power that is devoted to the transmission of data may be limited due to a variety of factors such as specific absorption rate (SAR) limitations, proxy sensors, etc.

Those skilled in the art will understand that the CA functionality is controlled by the eNB serving as the PCell for the UE. For example, upon detection that the UE is CA capable and a rate of transmission to the UE is under a maximum possible rate of transmission, the eNB may enable the CA functionality. The SCells may be selected and used for any data exchange, particularly with uplink transmissions. Thus, the UE may be configured to utilize select SCells in an area where the UE is located. However, as the CA functionality is controlled by the eNB serving as the PCell, the UE only advertises a capability of using SCells without being included in a selection process of the SCells with particular regard to uplink transmissions. Accordingly, the UE may only transmit a request to schedule the uplink transmissions with the eNB serving as the PCell, the PCell will then determine any SCells to be used for the uplink transmission.

FIG. 1 shows a system 100 where a UE utilizes a carrier quality metric (CQM) to select a manner of transmitting uplink data according to the exemplary embodiments. The system 100 includes a UE 105 and a plurality of eNBs 130, 135, 140. For the purposes of the exemplary embodiments, it may be considered that all of the eNBs 130-140 are associated with the same network. As discussed above, the UE 105 may associate with one of the eNBs 130-140 such as the eNB 130 to join the network corresponding to the eNB 130 such as a LTE network. The UE 105 and the eNBs 130-140 may also include the CA functionality that may be enabled and controlled by the eNB 130. As the UE 105 is associated with the eNB 130, the eNB 130 may provide the CA configuration for component carriers to be used by the UE 105 in which the eNB 130 may be the PCell and the eNBs 135, 140 may serve as the SCells.

The UE 105 may be any electronic component configured to join a network via the eNB 130. For example, the UE 105 may be a portable device such as a cellular phone, a smartphone, a tablet, a phablet, a laptop, a wearable, an Internet of things ("IoT") device, etc. In another example, the UE 105 may be a stationary device such as a desktop terminal. The UE 105 may also operate on a variety of different frequencies or channels (i.e., range of continuous frequencies). Accordingly, the UE 105 may include components that enable different radio access technologies. As shown in FIG. 1, the UE 105 may include a processor 110, a memory arrangement 115, and a transceiver 120. The UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using the CA functionality to increase a rate in which the data is exchanged in uplink, downlink, or both. In another example, the applications may include a measurement application 125 that is configured to determine the CQM of component carriers associated with the UE 105. As will be described in further detail below, the measurement application 125 may perform various measurement operations to determine the CQM. In a further example, the applications may include a selection application 127 that is configured to determine the mechanism to utilize in transmitting the uplink data. As will be described in further detail below, the selection application 127 may select between a first mechanism in which a MAC scheduling operation is modified, a second mechanism in which a forceful component carrier switching operation is utilized, or a third mechanism in which a forceful release operation is utilized.

It should be noted that the above noted applications being an application (e.g., a program) executed by the processor 110 is only exemplary. The applications may also be represented as components of one or more multifunctional programs, a separate incorporated component of the UE 105 or a modular component coupled to the UE 105, e.g., an integrated circuit with or without firmware. In addition, in some UEs, the functionality described for the processor 105 is split among two processors, a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store measurements or qualities associated with different component carriers available to the UE 105.

Figure 2:
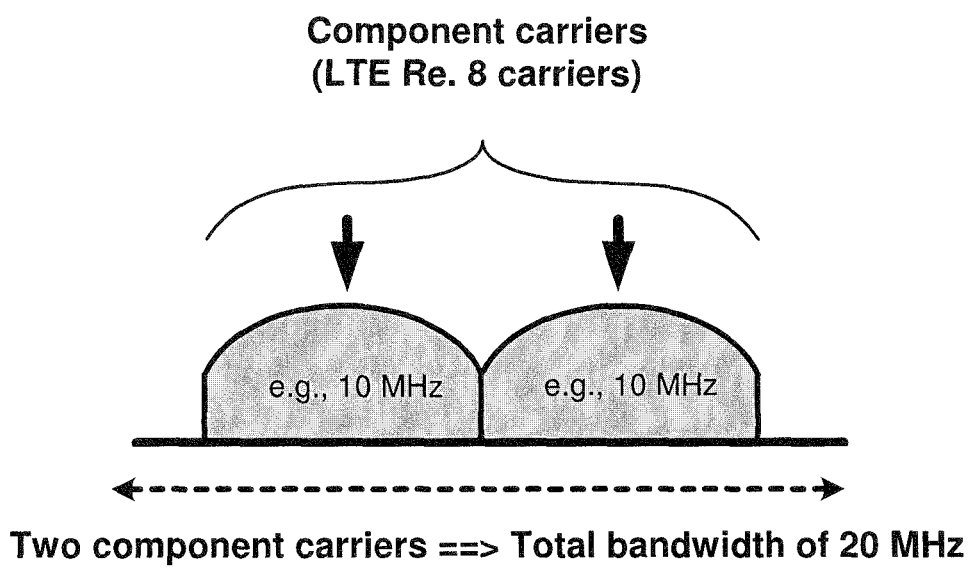
FIG. 2 shows an example of carrier aggregation.

Using the CA functionality, the eNB 130 may serve as the PCell while the eNBs 135, 140 may serve as at least one of the SCells. FIG. 2 shows an example of carrier aggregation. As shown in FIG. 2, the PCell may provide a first component carrier of 10 MHz representing a primary component carrier (PCC) operating on a first LTE band while the SCell may provide a second component carrier of 10 MHz representing the secondary component carrier (SCC) operating on a second LTE band, or the same LTE band as that of the PCC. Also shown in FIG. 2 is one type of carrier aggregation. Specifically, FIG. 2 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. As illustrated in FIG. 2, two component carriers each having a bandwidth of 10 MHz may be combined for a total bandwidth of 20 MHz. In a specific example, with carrier aggregation features enabled, the LTE-Advanced standard device supporting 20 MHz carrier aggregation may achieve downlink ("DL") throughput of 1,000 Mbps (when the maximum of five component carriers are aggregated). In another example, a theoretical maximum closer to 150 Mbps may be achieved such as with only two 10+10 MHz component carriers aggregated.

It should be noted that the network shown in the system 100 is only exemplary. For example, the number of eNBs 130-140 that may be in communicative range of the UE 105 may be more or fewer than three. Those skilled in the art will also understand that there may be any number of other types of networks that may also be in communicative range of the UE 105 and that the UE 105 may also be configured to establish connections with these other networks. That is, the UE 105 may also connect using different radio access technologies (RATs). For example, the system 100 may further include a legacy radio access network (e.g., 3G, CDMA, GSM, etc.), a wireless local area network, a WiFi network, etc. If configured for such a capability, the CA functionality may even be used between other types of networks. However, for exemplary purposes, the CA functionality is described herein with regard to the LTE network and the component carriers being provided by the eNBs 130-140.

Those skilled in the art will understand that the CA functionality only provides a potential of increased transmission efficiency. That is, the UE 105 may only realize the increased transmission efficiency when conditions permit. However, there may be conditions that exist that do not optimize the transmission efficiency under the CA functionality when transmitting uplink data from the UE 105 to the eNB 130. For example, under conventional approaches, the UE 105 may have a scheduled uplink transmission on a component carrier that has a poor connection quality. In another example, the power allocated to the PCell may only be a portion of the available uplink transmission power due to the SCells also being allocated a portion of the available uplink transmission power.

The exemplary embodiments are configured to improve the CA functionality when performing uplink transmissions. The exemplary embodiments provide a plurality of different mechanisms from which a component carrier selection is made based on a CQM measured for the available component carriers. Accordingly, an initial operation performed by the UE 105 is to determine the CQMs of the available component carriers. As noted above, the measurement application 125 is configured to determine the CQM of the component carriers available to the UE 105.

According to the exemplary embodiments, the CQM may be a derived metric based on PHY layer parameters for the component carriers. The CQM may therefore be used to determine how the component carriers will perform in transmitting uplink data from the UE 105 to the eNB 130. The CQM may be derived during a run time operation of the UE 105. During the run time operation, the measurement application 125 may measure a path loss (PL) metric. Those skilled in the art will understand the PL metric may relate to attenuation of the wireless signals through space. The value of the PL metric may be affected by a variety of different factors such as refraction, diffraction, reflection, absorption, etc. As the PL metric increases, the power headroom available for transmission of uplink data decreases. Thus, the PL metric may provide a direct correlation as a higher PL metric creates a higher likelihood that an error or failure of the uplink data transmission may result.

For exemplary purposes, the exemplary embodiments are described herein with the CQM being calculated based on the PL metric. However, it should be noted that the CQM may be calculated based on other metrics or combination of metrics. For example, the CQM may also be calculated based on or at least partially based on a buffer status report (BSR), a power headroom report (PHR), an uplink block error rate (BLER) to retransmission ratio, etc.

Since the CQM provides a qualitative indication, the CQM may be used as a basis of determining whether a first component carrier having a first CQM is likely to perform better in uplink data transmission than a second component carrier having a second CQM. Specifically, the CQM may provide a positive indication as to the quality of the component carrier. For example, the first CQM may be greater than the second CQM. Accordingly, the first component carrier may have a higher probability of performing an uplink transmission successfully to the eNB than the second component carrier. It should be noted that the CQM may apply to both the PCell and the SCell.

Once the CQMs of the component carriers have been determined, the selection application 127 may determine the mechanism to utilize in transmitting the uplink data based on the CQMs. As noted above, the selection application 127 may select between a first mechanism in which a MAC scheduling operation is modified, a second mechanism in which a forceful carrier switching operation is utilized, or a third mechanism in which a forceful release operation is utilized.

According to the first mechanism, the MAC scheduling operation may be a modification of the manner in which the MAC layer schedules uplink transmissions. Those skilled in the art will understand that currently the MAC layer schedules uplink transmissions based only on a priority of the data. Specifically, the MAC layer schedules uplink transmissions without any consideration of the PHY layer and the state or quality of the component carriers. Instead, the MAC layer determines the priority of the data to be transmitted in the uplink and orders the data based on this priority. The MAC layer then schedules the data based on the priority to any component carrier that is available, even poorly performing component carriers. The exemplary embodiments provide a modification such that the MAC layer also considers the quality of the component carrier as indicated in the CQMs.

Specifically, the first mechanism may enable the MAC layer to receive the CQMs of the component carriers associated with the UE 105. The priority of the data and the quality of the component carriers may then be used by the MAC layer in determining a scheduling order for the data. For example, there may be voice data for voice over Internet Protocol (VoIP) traffic and regular data such as used with a browser application. As voice data has a higher priority than regular data, the MAC layer utilizing the first mechanism according to the exemplary embodiments may determine which of the component carriers has the highest CQM and schedule the voice data prior to the regular data over the component carrier with the highest CQM. The regular data may be scheduled after the voice data and utilize any qualified component carrier (e.g., any component carrier having a CQM over a minimum threshold CQM value). In another example, the UE 105 may support certain voice command instructions or queries (e.g., Siri on the Apple iPhone.) The voice packets associated with these voice commands or queries may be transmitted on the UL to process the query. In this case, the voice command packets may be considered as high priority packets and thus be scheduled over a component carrier having a higher CQM.

As noted above, the eNB ultimately controls how the uplink data is eventually transmitted from the UE 105. Thus, it is noted that the above description of the first mechanism scheduling the uplink data is representative of the operations and signaling required for such a result to happen. Specifically, as measurements of component carriers are often performed by the UE 105 and transmitted from the UE 105 to the eNB 130, the measurements may artificially indicate the preference for a select component carrier over another component carrier. For example, the UE 105 may determine that the first component carrier has a first CQM that is higher than a second CQM of the second component carrier. Thus, the measurements reported to the eNB 130 may be correspondingly inflated or deflated such that the eNB 130 has a higher likelihood of scheduling the uplink transmissions over component carriers as desired by the UE 105 based on the CQMs. In this manner, the measurements reported to the eNB 130 are based on actual measurements but may be indicated with inflated/deflated values. Therefore, the selection and scheduling performed using the first mechanism may incorporate all operations that would be necessary and assume that the eNB 130 chooses to select/schedule as described. Thus, the first mechanism is a "soft" solution in which the eNB 130 ultimately decides the selection and scheduling of component carriers for the uplink transmissions.

According to the second mechanism, the forceful component carrier switching operation may relate to when the uplink data must be scheduled through the PCC of the PCell. That is, some data have network requirements or restrictions in which the PCC must be used. For example, voice over LTE (VoLTE) data during a VoLTE call is required to be transmitted as uplink data over the PCC whereas VoIP data may be transmitted as uplink data over the PCC or the SCC. In another example, control information such as physical uplink control channel (PUCCH) data is required to be transmitted as uplink data over the PCC whereas physical uplink shared channel (PUSCH) data may be transmitted as uplink data over the PCC or the SCC.

When the uplink data is determined to be required to use the PCC, the second mechanism may determine if the CQM of the PCell is indicative of the PCell underperforming. For example, the CQM of the PCell may be under a predetermined threshold CQM value. When the CQM of the PCell of the eNB 130 is below the predetermined threshold CQM value, the second mechanism according to the exemplary embodiments may utilize the forceful component carrier switching operation which includes generating data for the eNB 130 to perform a handover procedure. For example, the data used to cause the eNB 130 to perform the handover procedure may include one or more of the power headroom, the reference signal received power (RSRP), the reference signal received quality (RSRQ), etc. Thus, a modified A2/A5 LTE measurement event report that is power headroom influenced may be utilized for the handover procedure. The data may also indicate a SCC of an SCell that has a CQM that is above the predetermined threshold CQM value. That is, the UE 105 may determine that the SCC has a higher quality and higher likelihood for the uplink transmission to be performed over the PCC. Accordingly, the handover procedure may be performed such that the PCell is released and the SCell becomes the PCell that provides a new PCC. In this manner, a better PCC may be used to transmit the uplink data requiring a transmission over the PCC.

It is noted that the minimum threshold CQM value may be static, dynamic, or predetermined by type of data. In a first example, the second mechanism may utilize a static minimum threshold CQM value that is used under any circumstance and for all types of data. In a second example, the second mechanism may utilize a dynamic minimum threshold CQM value that is determined based on the circumstances and network conditions being experienced by the UE 105. For example, when the network conditions are relatively poor, the minimum threshold CQM value may be lowered to accommodate for the poor conditions. Whereas, when the network conditions are better, the minimum threshold CQM value may be raised. In a third example, the second mechanism may utilize a predetermined set of minimum threshold CQM values based on the type of data to be transmitted as uplink data. As those skilled in the art will understand, certain types of data such as regular data may have a higher error tolerance than other types of data such as voice data. Thus, the second mechanism may select the minimum threshold CQM value based on the type of data to be transmitted as uplink data. In a fourth example, the second mechanism may utilize a combination of dynamic and predetermined CQM values.

It should be noted that the requirement that the PCC be used for uplink data to be transmitted is only exemplary of a network requirement or restriction. That is, the requirement of the PCC may represent any network requirement or restriction that forces a particular component carrier to be used. In another example, time sensitive data such as voice data or personal assistant application data may require that a particular component carrier having a minimum threshold be used. In this manner, certain component carriers may be removed from consideration to transmit these types of uplink data.

According to the third mechanism, the forceful release operation may be a fall back when the second mechanism fails to yield a positive result or a sufficient enough result. The forceful release operation may attempt to drop a component carrier from being used such that the maximum transmit power may be re-distributed with the remaining component carriers where each remaining component carrier is allotted a higher percentage of the maximum transmit power. In one example, the PCC may be allotted the entire available transmit power. It should be noted that the third mechanism being a fall back to the second mechanism is only exemplary. The third mechanism may also serve as a fall back for the first mechanism. As the third mechanism may also relate to when the PCC and at least one SCC remain as component carriers, the third mechanism may further be utilized independently of whether the second mechanism is used. In addition, the third mechanism may also be used independently of the first mechanism. However, for exemplary purposes, the third mechanism will be described as a fall back operation.

Since the UE 105 has a maximum transmit power that sets a limit to the available transmit power, the UE 105 will distribute the available transmit power to the component carriers being used. Those skilled in the art will understand that, in general, the maximum transmit power is based on regulatory requirements in various countries or jurisdictions, but in some cases may also be related to hardware specifications of the UE 105, e.g., available battery power, etc. Thus, with more component carriers being used, each component carrier is allotted a decreasing percentage of the available transmit power. In some cases, the available transmit power may be split evenly among the component carriers being used. The UE 105 is also not allowed to exceed limits on the component parts of the available transmit power such as the specific absorption limit or proxy sensor limit. When the UE 105 is reporting relatively poor performance such as a higher PL metric, utilizing the CA functionality or further SCells in the CA functionality may be inefficient as this reduces the overall power available for any one of the component carriers for data transmission, especially with power being devoted to underperforming component carriers.

The forceful release operation of the third mechanism may therefore cause a component carrier to be released such that more power may be devoted to the remaining component carriers. By devoting more power to the remaining component carriers, there is a higher likelihood that the remaining component carriers have sufficient power to transmit the uplink data successfully. The UE 105 may aggressively report channel feedback to the eNB 130 in such a way that the eNB 130 responds by not scheduling uplink transmissions on a component carrier determined to be poor (e.g., determined to have a low CQM). Thus, the UE 105 may have a more reliable PCC or remaining SCC to aid in continuing a network session and not face a radio link failure (RLF) or call drop.

It is noted that the third mechanism may also utilize a further approach in which the distribution of the available transmit power may be based on the CQMs of the component carriers. For example, a component carrier having a highest CQM (relative to the other component carriers currently being used by the UE 105) may be allotted a higher percentage of the available transmit power. In this example, a dynamic distribution of the available transmit power may be used, rather than an even split among the component carriers.

It is also noted that the second and third mechanisms may also be "soft" solutions in a substantially similar manner as the first mechanism. For example, the second mechanism includes generating data to cause a handover procedure to be performed. However, the decision to perform the handover procedure ultimately rests with the network. In another example, the third mechanism includes generating channel feedback information for one or more component carriers to be released. However, the decision to release the channels ultimately rests with the network.

As noted above, the selection application 127 may be configured to utilize the first, second, and third mechanisms. The selection application 127 may also determine the manner in which the first, second, and third mechanisms are selected based on the circumstances and network conditions of the UE 105. In a first example, the selection application 127 may determine whether the uplink data to be transmitted requires the PCC. If the uplink data may be transmitted over the PCC or the SCC, the selection application 127 may select the first mechanism and dynamically schedule the uplink data based on the component carrier having the highest CQM and best performance. It is noted that the selection application 127 may also select the third mechanism under this scenario. In a second example, the selection application 127 may determine that the uplink data must be transmitted over the PCC. If the uplink data must be transmitted over the PCC, the selection application 127 may select the second mechanism and establish a connection with the best PCC to transmit the uplink data.

Figure 3:
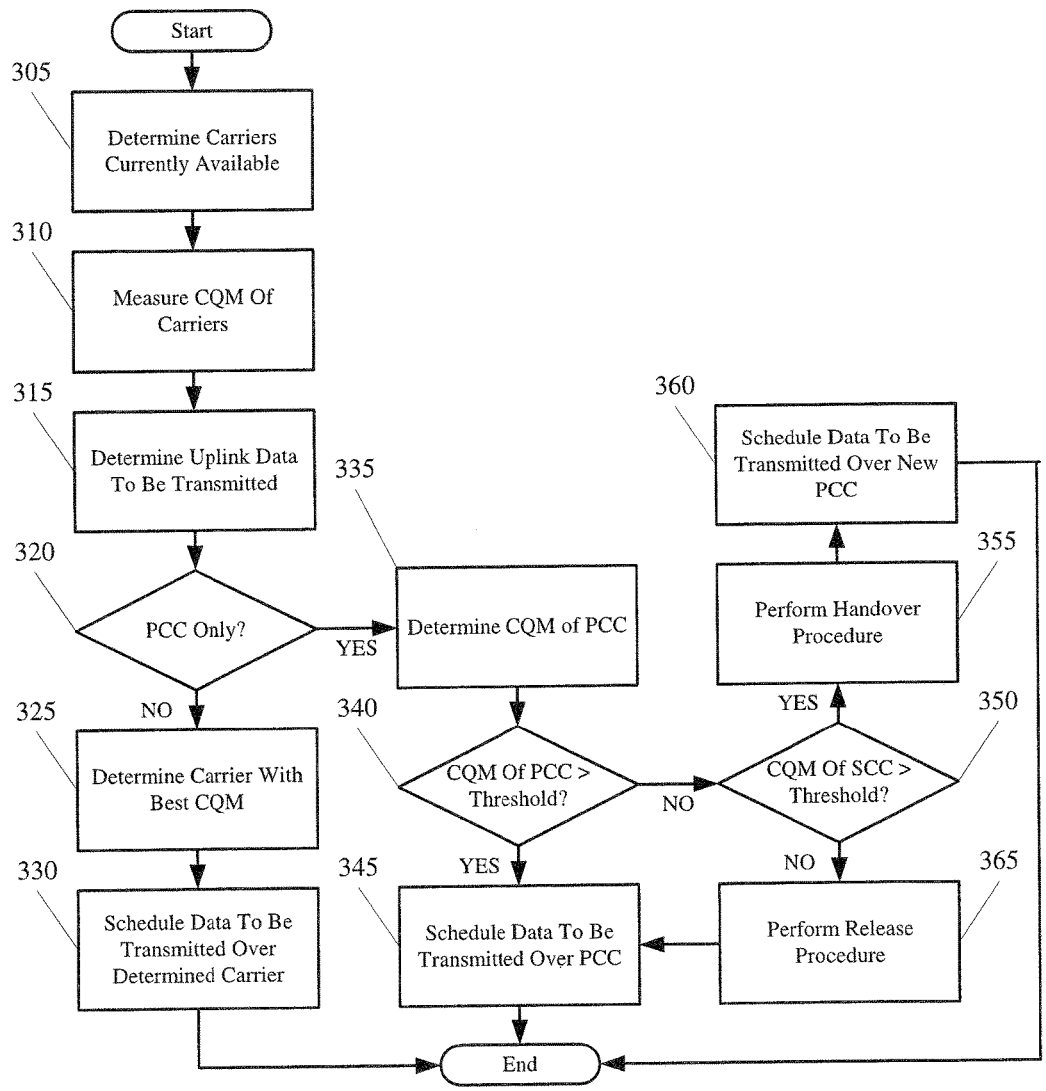
FIG. 3 shows a method for carrier aware scheduling according to various exemplary embodiments described herein.

FIG. 3 shows a method 300 for component carrier aware scheduling according to the exemplary embodiments. The method 300 may relate to how the UE 105 determines which of the first, second, and third mechanisms to utilize based on the circumstances and network conditions of the UE 105. The method 300 also relates to performing the corresponding mechanism. Thus, the method 300 is performed by the UE 105 and the method 300 will be described with regard to the system 100 of FIG. 1.

In 305, the UE 105 determines the component carriers that are currently available and/or being used. Specifically, the UE 105 may determine the component carriers during a run time operation. The UE 105 and the eNB 130 with which the UE 105 is associated may both be configured with the CA functionality. Thus, the component carriers may include the PCC and at least one SCC. In 310, the UE 105 measures the CQM of the component carriers. As described above, the CQM may be based on the PL metric as the PL metric directly correlates to the transmit power headroom available for uplink data transmissions. It should also be noted that 305 and 310 may be performed continuously as component carriers are added and deleted and as the conditions the UE 105 is experiencing are changing that may affect the CQM of the component carriers.

In 315, the UE 105 determines that there is uplink data to be transmitted. As described above, the uplink data may have restrictions or requirements associated therewith. In a specific example, the uplink data may be required to be transmitted over the PCC such as VoLTE data and control data. As illustrated, the method 300 relates to when the requirement is transmissions over the PCC. However, it should again be noted that this requirement is only exemplary and the exemplary embodiments may be modified accordingly for other types of requirements. In 320, the UE 105 determines whether the uplink data is required to be transmitted over the PCC.

If the uplink data is not required to be transmitted over the PCC (e.g., may also be transmitted over the one or more SCCs), the UE 105 continues the method 300 to 325. Specifically, the first mechanism may be used. In 325, the UE 105 determines the component carrier with the highest CQM (i.e., the highest quality among the component carriers currently being used). In 330, the UE 105 schedules the uplink data to be transmitted over the determined component carrier. It should again be noted that the UE 105 does not actually schedule the uplink data but transmits data to the eNB 130 to increase the probability that the uplink data will be scheduled on the determined component carrier. It should also be noted that the UE 105 may also consider the priority of data (e.g., time sensitive data) in scheduling the uplink data.

Returning to 320, if the uplink data is required to be transmitted over the PCC, the UE 105 continues the method 300 to 335. Specifically, the second mechanism may be used. In 330, the UE 105 determines the CQM of the PCC. Again, the second mechanism relates to the quality of the current PCC provided by the PCell (e.g., the eNB 130). In 340, the UE 105 determines whether the CQM of the PCC is greater than a predetermined threshold. The predetermined threshold may be a minimum quality that the current PCC must have for the PCC to be used in transmitting the uplink data. As noted above, the predetermined threshold may be static, dynamic, predetermined, or a combination thereof.

If the CQM of the current PCC is above the predetermined threshold, the UE 105 continues the method 300 to 345. In 345, the UE 105 schedules the uplink data to be transmitted over the current PCC. Again, the scheduling of the uplink data may incorporate all necessary operations and signals to increase the probability that the eNB 130 will schedule the uplink data on the current PCC.

If the CQM of the current PCC is below the predetermined threshold, the UE 105 continues the method 300 to 350. In 350, the UE 105 determines whether the CQM of the SCC (when the CA functionality has only one SCC) or any of the SCCs (when the CA functionality has more than one SCC) is greater than a predetermined threshold. The predetermined threshold in 350 may be substantially similar to the predetermined threshold of 340.

When the CQM of the SCC is greater than the predetermined threshold, in 355, the UE 105 performs a handover procedure. Again, the performing of the handover procedure may incorporate the operations and signaling necessary for the eNB 130 to initiate the handover procedure such that the UE 105 associates with another eNB (e.g., eNB 135) that may have been indicated by the UE 105 as providing a better connection. When the UE 105 has completed the handover procedure, the UE 105 may have a new PCC with the newly associated eNB. Thus, in 360, the second mechanism may be utilized by scheduling the data to be transmitted over the new PCC.

Returning to 350, if the CQM of the SCC is below the predetermined threshold, the UE 105 may continue the method 300 to 365. That is, the third mechanism may be used. The CQM of the SCC being below the predetermined threshold may indicate a scenario where results of the second mechanism may not yield a sufficient result. Thus, the third mechanism may be a fall back for the second mechanism. However, it should again be noted that the third mechanism being a fall back to the second mechanism is only exemplary.

In 365, the UE 105 performs a release procedure in which one or more SCCs are released. The release of the SCCs may incorporate data being generated and transmitted to the eNB 130 such that data exchange is not scheduled over these SCCs. As illustrated, the release procedure may be configured such that the only remaining component carrier is the PCC. That is, the PCC is devoted an entirety of the available transmit power. Thus, in 345, the UE 105 schedules the data to be transmitted over the current PCC as the current PCC has more power to transmit the uplink data and has a higher likelihood of successfully transmitting the uplink data.

The exemplary embodiments provide a device, system, and method of scheduling uplink data transmissions with a knowledge of component carrier quality. The exemplary embodiments may determine a component carrier quality measurement metric that identifies whether a corresponding component carrier is likely to perform a transmission as desired. Based on this metric, the exemplary embodiments provide a plurality of mechanisms that enable uplink data to be transmitted with an increasing likelihood of success. Specifically, the exemplary embodiments enable a MAC layer scheduling of a best available component carrier, a handover procedure to a PCell having a higher quality PCC for uplink data requiring transmissions over the PCC, and a release procedure to re-distribute more power to remaining carriers for uplink data transmissions.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment connected to a network component, the user equipment and the network component configured with a carrier aggregation functionality:
   determining a primary component carrier and at least one secondary component carrier associated with the carrier aggregation functionality of the user equipment;
   determining a component carrier quality measurement (CQM) metric for each of the component carriers;

selecting one of the primary component carrier and the at least one secondary component carrier based on the CQM metrics;
generating measurement data for use by the network component to schedule the transmission of an uplink data packet by the user equipment to increase a probability that the network component will schedule the transmission of the uplink data packet by the user equipment over the selected component carrier; and
transmitting the measurement data to the network component over the selected component carrier.

2. The method of claim 1, wherein the CQM metric is based on one of a path loss metric, a buffer status report (BSR), a power headroom report (PHR), or an uplink block error rate (BLER) to retransmission ratio.

3. The method of claim 1, wherein the selection of the one of the primary component carrier and the at least one secondary component carrier is further based on one of a priority of the uplink data packet or a type of the uplink data packet.

4. A user equipment, comprising:
a transceiver configured to connect the user equipment to a network component, the user equipment and the network component configured for a carrier aggregation functionality; and
a processor configured to determine a primary component carrier and at least one secondary component carrier associated with the carrier aggregation functionality of the user equipment, determine a component carrier quality measurement (CQM) metric for each of the component carriers, select one of the primary component carrier and the at least one secondary component carrier based on the CQM metrics, generate measurement data for use by the network component to schedule the transmission of an uplink data packet by the user equipment to increase a probability that the network component will schedule the transmission of the uplink data packet by the user equipment over the selected component carrier, and wherein the transceiver transmits the measurement data to the network component over the selected component carrier.

5. The user equipment of claim 4, wherein the CQM metric is based on one of a path loss metric, a buffer status report (BSR), a power headroom report (PHR), or an uplink block error rate (BLER) to retransmission ratio.

6. The user equipment of claim 4, wherein the selection of the one of the primary component carrier and the at least one secondary component carrier is further based on one of a priority of the uplink data packet or a type of the uplink data packet.

7. A method, comprising:
at a user equipment connected to a network component, the user equipment and the network component configured with a carrier aggregation functionality:
determining a primary component carrier and at least one secondary component carrier associated with the carrier aggregation functionality of the user equipment;
measuring a component carrier quality measurement (CQM) metric for each of the component carriers;
when an uplink data packet is capable of being transmitted over only the primary component carrier, determining whether the CQM metric of the primary component carrier is above a predetermined threshold;
when the CQM metric of the primary component carrier is above the predetermined threshold, generating measurement data indicating the uplink data packet is to be transmitted over the primary component carrier; and
transmitting the measurement data to the network component.

8. The method of claim 7, further comprising:
when the CQM metric of the primary component carrier is below the predetermined threshold, determining one of the at least one secondary component carrier that has a CQM metric above the predetermined threshold;
generating second measurement data indicative to cause a handover procedure to be performed where the primary component carrier is released and the determined secondary component carrier becomes a further primary component carrier over which the uplink data is to be transmitted; and
transmitting the second measurement data to the network component.

9. The method of claim 8, wherein the second measurement data includes one of a reference signal received power (RSRP) or a reference signal received quality (RSRQ) for the primary component carrier that indicates to the network component that the handover procedure should be initiated.

10. The method of claim 8, further comprising:
when the CQM metric of each of the at least one secondary component carrier is below the predetermined threshold, generating second measurement data to increase a probability that the network component releases one or more of the at least one secondary component carriers; and
transmitting the third measurement data to the network component.

11. The method of claim 10, further comprising:
when the one or more of the at least one secondary component carriers are released by the network component, allocating uplink transmit power from the released one or more of the at least one secondary component carriers to the primary component carrier and any remaining at least one secondary component carriers.

12. The method of claim 7, further comprising:
allocating uplink transmit power to the primary component carrier and the at least one secondary component carrier based on the CQM metric of the primary component carrier and the at least one secondary component carrier.

13. The method of claim 7, wherein the predetermined threshold comprises one of a static threshold, a dynamic threshold, or a type threshold based on a type of the uplink data packet.

14. The method of claim 13, wherein the dynamic threshold is based on network conditions being experienced by the user equipment.

15. The method of claim 7, wherein the CQM metric is based on one of a path loss metric, a buffer status report (BSR), a power headroom report (PHR), or an uplink block error rate (BLER) to retransmission ratio.

16. A user equipment, comprising:
a transceiver configured to connect the user equipment to a network component, the user equipment and the network component configured for a carrier aggregation functionality; and
a processor configured to determine a primary component carrier and at least one secondary component carrier associated with the carrier aggregation functionality of the user equipment, measure a component carrier quality measurement (CQM) metric for each of the component carriers, when an uplink data packet is capable of being transmitted over only the primary component carrier, the processor determines whether the CQM metric of the primary component carrier is above a predetermined threshold and when the CQM metric of the primary component carrier is above the predetermined threshold, the processor generates measurement data indicating the uplink data packet is to be transmitted over the primary component carrier, and wherein the transceiver transmits the measurement data to the network component.

17. The user equipment of claim 16, wherein when the CQM metric of the primary component carrier is below the predetermined threshold, the processor determines one of the at least one secondary component carrier that has a CQM metric above the predetermined threshold, generates second measurement data indicative to cause a handover procedure to be performed where the primary component carrier is released and the determined secondary component carrier becomes a further primary component carrier over which the uplink data is to be transmitted, and wherein the transceiver transmits the second measurement data to the network component.

18. The user equipment of claim 17, wherein when the CQM metric of each of the at least one secondary component carrier is below the predetermined threshold, the processor generates second measurement data to increase a probability that the network component releases one or more of the at least one secondary component carriers, and wherein the transceiver transmits the third measurement data to the network component.

19. The user equipment of claim 18, wherein when the one or more of the at least one secondary component carriers are released by the network component, the processor allocates uplink transmit power from the released one or more of the at least one secondary component carriers to the primary component carrier and any remaining at least one secondary component carriers.

20. The user equipment of claim 16, wherein the processor allocates uplink transmit power to the primary component carrier and the at least one secondary component carrier based on the CQM metric of the primary component carrier and the at least one secondary component carrier.

* * * * *